United States Patent
Luo et al.

(10) Patent No.: US 9,871,931 B1
(45) Date of Patent: Jan. 16, 2018

(54) SCANNER CAPABLE OF EXECUTING STATIC CALIBRATION AND COMPENSATION VALUE ADJUSTMENT METHOD THEREFOR

(71) Applicant: TECO IMAGE SYSTEMS CO., LTD., Taipei (TW)

(72) Inventors: Nai-Wun Luo, Taipei (TW); Ming-Chu Hsu, Taipei (TW)

(73) Assignee: Teco Image Systems Co., Ltd., Taipei (TW)

( * ) Notice: Subject to any disclaimer, the term of this patent is extended or adjusted under 35 U.S.C. 154(b) by 0 days.

(21) Appl. No.: 15/339,285

(22) Filed: Oct. 31, 2016

(30) Foreign Application Priority Data

Sep. 14, 2016 (TW) .............................. 105129905 A

(51) Int. Cl.
  *H04N 1/00* (2006.01)
(52) U.S. Cl.
  CPC ..... *H04N 1/00087* (2013.01); *H04N 1/00013* (2013.01); *H04N 1/00039* (2013.01); *H04N 1/00045* (2013.01); *H04N 2201/0005* (2013.01); *H04N 2201/0081* (2013.01)
(58) Field of Classification Search
  CPC .......... H04N 1/00087; H04N 1/00013; H04N 1/00018; H04N 1/00063; H04N 1/00045
  USPC ....................................... 358/518, 406, 504
  See application file for complete search history.

(56) References Cited

U.S. PATENT DOCUMENTS

| | | | |
|---|---|---|---|
| 5,204,761 A | * | 4/1993 | Gusmano ............... H04N 1/401 358/406 |
| 5,285,297 A | | 2/1994 | Rose et al. |
| 6,459,825 B1 | | 10/2002 | Lippincott |
| 8,786,914 B1 | | 7/2014 | Mui et al. |

FOREIGN PATENT DOCUMENTS

TW 201417562 5/2014

* cited by examiner

*Primary Examiner* — Jamares Q Washington
(74) *Attorney, Agent, or Firm* — Kirton McConkie; Evan R. Witt

(57) ABSTRACT

A scanner capable of executing a static calibration and a compensation value adjustment method therefor are disclosed. The scanner includes a calibration piece, a memory, an image capturing unit and a processing unit. The image capturing unit acquires an initial scanned pixel data. A compensation offset-ratio data having a first offset-ratio average is generated according to the initial scanned pixel data and a standard compensation data by the processing unit. Plural selected pixels are determined according to the compensation offset-ratio data, the first offset-ratio average and the predetermined compensation threshold value. A second offset-ratio average is obtained by removing the compensation offset-ratio values of the compensation offset-ratio data of the selected pixels. The initial scanned pixel data is transformed into a static compensation pixel data according to the second offset-ratio average and the standard compensation data.

12 Claims, 5 Drawing Sheets

SCANNER CAPABLE OF EXECUTING STATIC CALIBRATION AND COMPENSATION VALUE ADJUSTMENT METHOD THEREFOR

FIELD OF THE INVENTION

The present invention relates to a scanner and an adjustment method therefor, and more particularly to a scanner capable of executing a static calibration and a compensation value adjustment method therefor.

BACKGROUND OF THE INVENTION

Currently, the scanner has been widely used for scanning and outputting images. Since the optical properties of the image-capturing device in the scanner are degraded over time, a calibration or compensation operation for adjusting the gains and offsets for the respective pixels of the scanner should be executed. Consequently, the output images having the same quality as the original scanned objects are obtained. Namely, the quality of scanned images is directly related to the quality of the calibration. Typically, whether in handheld scanners, flatbed scanners or automatic sheet-fed scanners, the calibration is accomplished by utilizing the image capturing device to scan an area of a calibration piece with known optically properties dynamically, so as to obtain a compensation value for the successive image processing operation accordingly.

For example, when a handheld scanner is used, the user can use a calibration piece attached to perform calibration. The user holds the handheld scanner and moves the image capturing device of the scanner on the calibration piece so as to capture the image information of the calibration piece. Consequently, pixel compensation values for the successive image processing operation are obtained. In order to facilitate the user to accomplish the calibration, the size of the calibration piece for the handheld scanner is larger than that of the flatbed scanner. Consequently, the calibration piece for the handheld scanner is not easy to be preserved and carried. In addition, while performing the calibration operation, the user has to hold the handheld scanner to scan. The handheld scanner can't execute the calibration operation automatically, so that it can't be utilized conveniently. Moreover, contamination for example dust or dirt covers the calibration piece easily, and creases may be formed on the calibration piece. Hence, when the handheld scanner scans the above-mentioned calibration piece (i.e. dust, dirt or creases on the calibration piece occurs), the compensation values calculated for the respective pixels of the scanner during the calibration will be incorrect. Consequently, the accuracy of the successive image calibration and the quality of the outputting image are adversely influenced.

SUMMARY OF THE INVENTION

The present invention provides a scanner capable of executing a static calibration and a compensation value adjustment method therefor. The image capturing unit and the calibration piece of the scanner are configured to execute the calibration operation on a static state without moving. Consequently, the incorrect compensation values for the respective pixels of the scanner during the calibration caused by dust, dirt or creases on the calibration piece are avoided. The accuracy of the successive image calibration and the quality of the outputting image are improved.

The present invention further provides a scanner capable of executing a static calibration and a compensation value adjustment method therefor. The calibration piece has a smaller size, and the scanner can execute the calibration operation automatically. Even though there are some dust or dirt covering on the calibration piece or creases formed on the calibration piece, the compensation value adjustment for the respective pixels of the scanner during the static calibration can be executed automatically, and the accuracy of the successive image calibration and the quality of the outputting image are improved.

In accordance with an aspect of the present invention, a scanner capable of executing a static calibration is provided. The scanner includes a calibration piece, a memory, an image capturing unit and a processing unit. The memory has a compensation database. A standard compensation data including plural standard compensation values and a predetermined compensation threshold value are stored in the compensation database. The image capturing unit includes plural pixels and is configured to scan and acquire the image information of the calibration piece and obtain an initial scanned pixel data including plural initial scanned pixel values of the plural pixels. The processing unit is connected with the image capturing unit and the compensation database, and includes a static correction and compensation module. The static correction and compensation module is executed to receive the initial scanned pixel data and generate a compensation offset-ratio data including plural compensation offset-ratio values of the plural pixels according to the initial scanned pixel data and the standard compensation data, wherein the compensation offset-ratio data has a first offset-ratio average. Plural selected pixels are determined according to the compensation offset-ratio data, the first offset-ratio average and the predetermined compensation threshold value, and a second offset-ratio average is obtained by removing the compensation offset-ratio values of the compensation offset-ratio data of the selected pixels. Plural replacement compensation values of the selected pixels are generated according to the second offset-ratio average and the respective standard compensation values of the standard compensation data of the selected pixels. The initial scanned pixel data is transformed into a static compensation pixel data by replacing the initial scanned pixel values of the initial scanned pixel data of the selected pixels with the replacement compensation elements respectively.

In accordance with another aspect of the present invention, a compensation value adjustment method for a scanner is provided. The method includes steps of: (a) providing a calibration piece, a standard compensation data including plural standard compensation values and a predetermined compensation threshold value; (b) utilizing an image capturing unit having plural pixels to scan and acquire plural pixel values relative to the calibration piece and obtain an initial scanned pixel data including the pixel values; (c) generating a compensation offset-ratio data including plural compensation offset-ratio values according to the initial scanned pixel data and the standard compensation data, wherein the compensation offset-ratio data has a first offset-ratio average; (d) determining plural selected pixels according to the compensation offset-ratio data, the first offset-ratio average and the predetermined compensation threshold value, and obtaining a second offset-ratio average by removing the compensation offset-ratio values of the compensation offset-ratio data of the selected pixels; and (e) generating plural replacement compensation values according to the second offset-ratio average and the respective standard compensation values of the standard compensation data of the selected pixels, and transforming the initial scanned pixel data into a static compensation pixel data by replacing the initial scanned pixel values of the initial scanned pixel data of the selected pixels with the replacement compensation values respectively.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
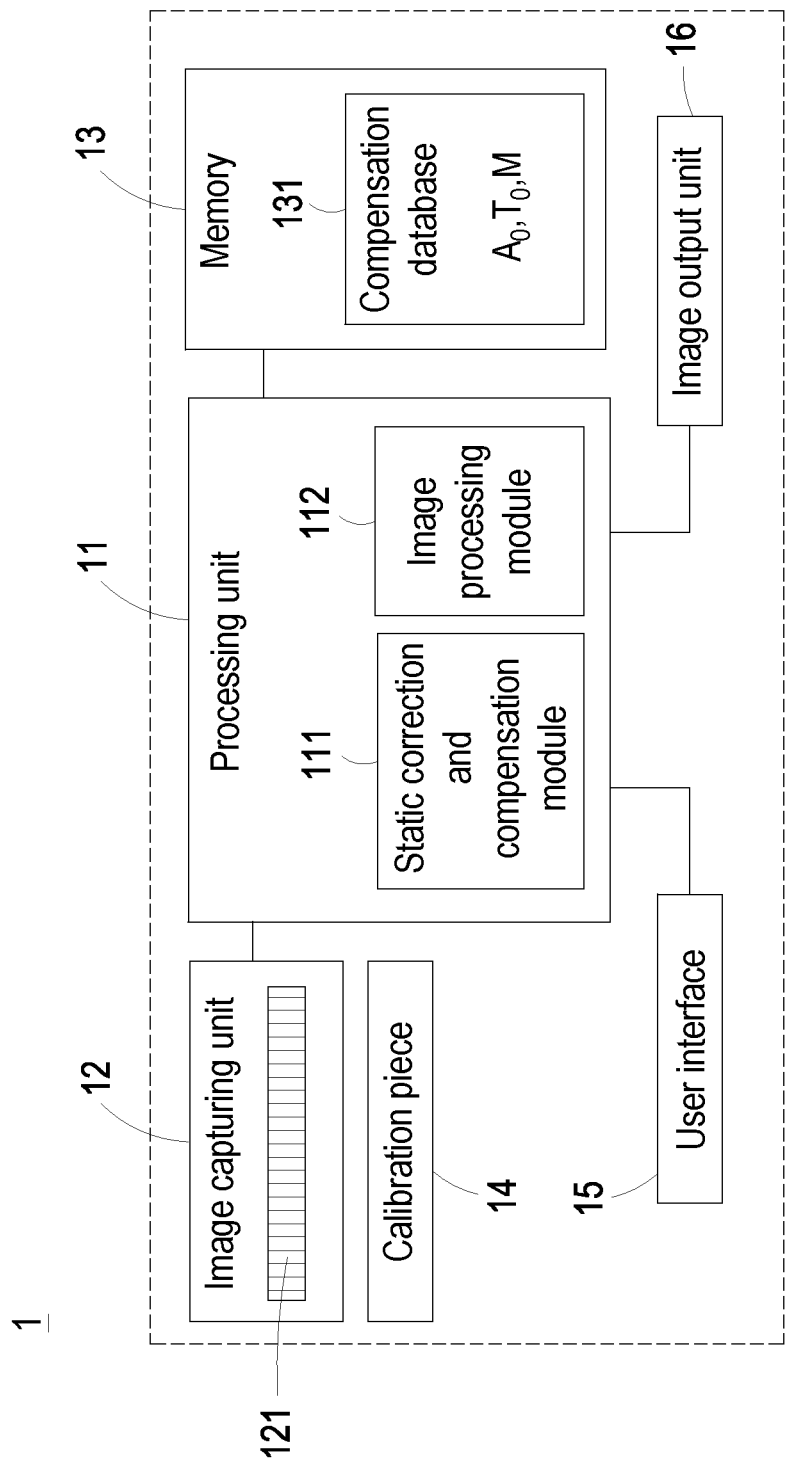
FIG. 1A is a structural block diagram illustrating a scanner capable of executing a static calibration according to a preferred embodiment of the present invention.
Figure 1B:
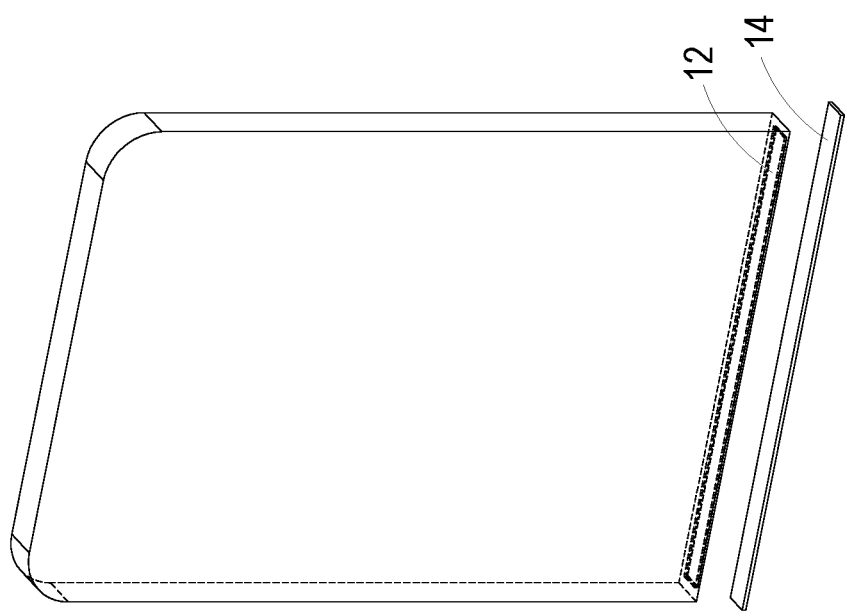
FIG. 1B is a perspective view illustrating the scanner of FIG. 1A executing the static calibration.
Figure 2:
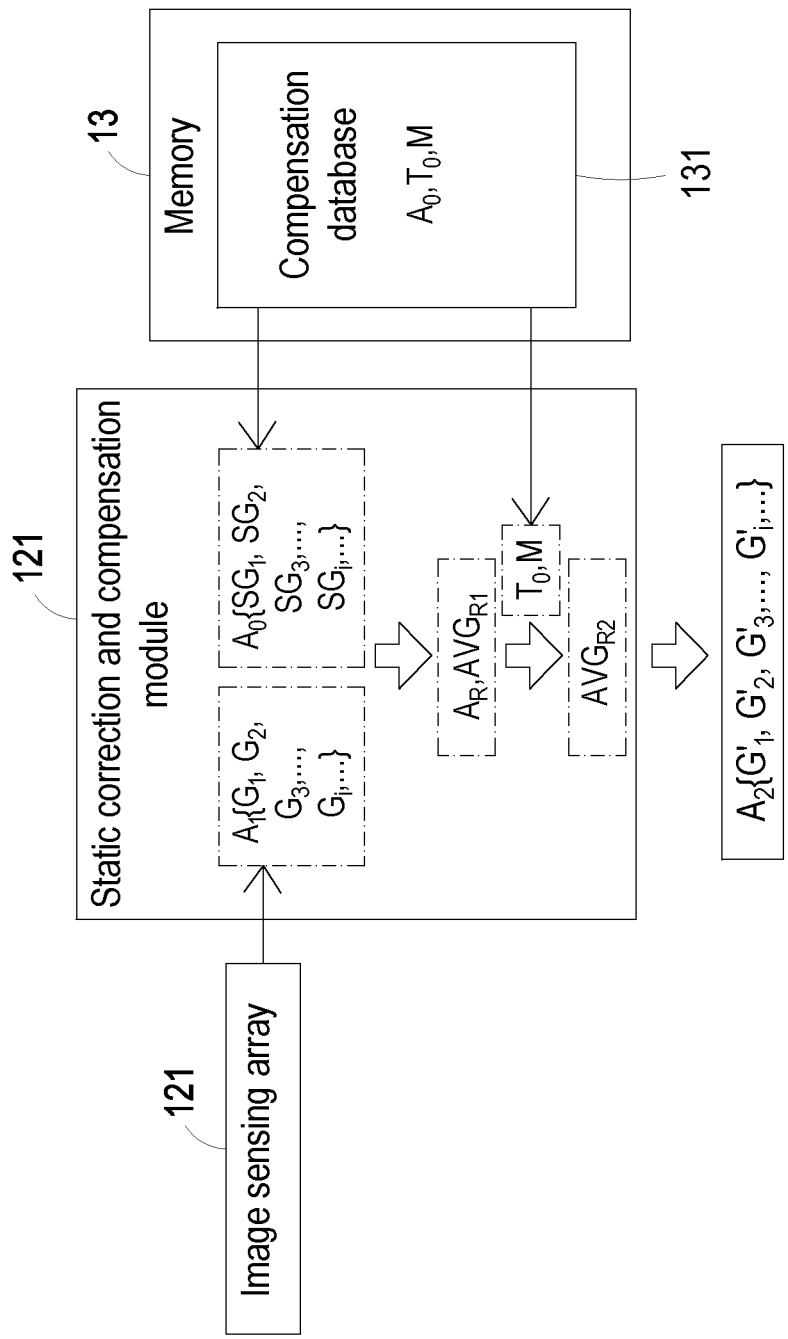
FIG. 2 is a block diagram illustrating the scanner of FIG. 1A executing the static calibration.

FIG. 1A is a structural block diagram illustrating a scanner capable of executing a static calibration according to a preferred embodiment of the present invention. FIG. 1B is a perspective view illustrating the scanner of FIG. 1A executing the static calibration. FIG. 2 is a block diagram illustrating the scanner of FIG. 1A executing the static calibration. As shown in FIGS. 1A, 1B and 2, the scanner 1 capable of executing the static calibration (hereafter referred to as the scanner) includes a processing unit 11, an image capturing unit 12, a memory 13 and a calibration piece 14. The processing unit 11 is configured to perform various kinds of functions, including for example processing images and executing the static calibration operation. The processing unit 11 further includes a static correction and compensation module 111 and an image processing module 112. The static correction and compensation module 111 is executed by the processing unit 11 to perform the static calibration operation, and the image processing module 112 is executed by the processing unit 11 to process images. The image capturing unit 12 is connected with the processing unit 11 and includes an image sensing array 121. The image sensing array 121 includes plural pixels and is configured to scan and capture the image information of the calibration piece 14 and the image information of scanned objects (not shown) and transmit the above-mentioned image information to the processing unit 11. In this embodiment, the image capturing unit 12 is a contact image sensor (CIS) or a charge-coupled device (CCD). The memory 13 is connected to the processing unit 11 and includes a compensation database 131 for storing a standard compensation data $A_0$, a predetermined compensation threshold value $T_0$ and a predetermined adjusting parameter M. The standard compensation data $A_0$ is known data exclusive to the scanner 1 and designated as $A_0=[SG_i|SG_1, SG_2, SG_3, \ldots, SG_n]$, wherein the standard compensation data $A_0$ includes plural standard compensation values $SG_i$ of the respective pixels, $i=1, 2, 3, \ldots, n$, and n is an integer lager than 1. The calibration piece 14 is disposed on a structural part of the scanner 1 or separated from the scanner 1, so that the calibration piece 14 can be scanned by the image capturing unit 12 for facilitating to execute the static calibration operation. In the embodiment, the scan 1 further includes a user interface 15, which is electrically connected with the processing unit 11. The static correction and compensation module 111 is executed by the processing unit 11 to perform the static calibration operation according to the operation by the user via the user interface 15.

In the embodiment, preferably but not exclusively, the scanner 1 is a handheld scanner, and the calibration piece 14 is disposed on a structural part of the handheld scanner and aligned with the image capturing unit 12. Before the scanner 1 is used for scanning an object, the user can enable the scanner 1 to perform the static calibration operation in advance. Firstly, when the processing unit 11 receives a calibrating instruction inputted via the user interface 15 by the user, the processing unit 11 enables the static correction and compensation module 111 to execute the static calibration operation. Then, the image capturing unit 12 scans and captures the image information of the calibration piece 14 and obtains an initial scanned pixel data $A_1=[G_i|G_1, G_2, G_3, \ldots, G_n]$, which includes respective initial scanned pixel values of the respective pixels. In this step, both of the image capturing unit 12 and the calibration piece 14 are stationary during the period of performing the calibration. Thereafter, the processing unit 11 acquires the standard compensation data $A_0$ from the compensation database 131 of the memory 13 and a compensation offset-ratio data designated as $A_R=[R_i|R_1, R_2, R_3, \ldots, R_n]$ is generated by the processing unit 11 according to the initial scanned pixel data $A_1$ and the standard compensation data $A_0$ and calculated by the following equation (1), where the compensation offset-ratio data $A_R$ includes plural compensation offset-ratio values $R_i$ of the respective pixels.

$$R_i = \frac{SG_i - G_i}{SG_i} \quad (1)$$

In detail, the processing unit 11 compares each initial scanned pixel value $G_i$ of the initial scanned pixel data $A_1$ with the corresponding standard compensation value $SG_i$ of the standard compensation data $A_0$ for the respective pixels. Consequently, the corresponding compensation offset-ratio value $R_i$ of the compensation offset-ratio data $A_R$ for the respective pixels is obtained.

Then, the processing unit 11 obtains a first offset-ratio average $AVG_{R1}$ according to the compensation offset-ratio data $A_R$ calculated by the following equation (2). The first offset-ratio average $AVG_{R1}$ is the average of all compensation offset-ratio values of the compensation offset-ratio data $A_R$.

$$AVG_{R1} = \frac{\sum_{i=1}^{n} R_i}{n} \quad (2)$$

Then, the processing unit 11 acquires the predetermined compensation threshold value $T_0$ from the compensation database 131 of the memory 13 and determines if the absolute value of the difference between each compensation offset-ratio value of the compensation offset-ratio data $A_R$ and the first offset-ratio average $AVG_{R1}$ for the respective pixels is larger than the corresponding predetermined compensation threshold value $T_0$, as shown in the following equation (3). If the absolute value of the difference for any one of the pixels is larger than the predetermined compensation threshold value $T_0$, it means that the initial scanned pixel value for the specific one of the plural pixels is an error pixel value for the specific pixel during the static calibration operation.

$$|AVG_{R1} - R_N| > T_0 \qquad (3)$$

For example, while the absolute value of the difference between the N-th compensation offset-ratio value of the compensation offset-ratio data $A_R$ and the first offset-ratio average $AVG_{R1}$ for the N-th pixel is larger than the predetermined compensation threshold value $T_0$, the N-th initial scanned pixel value of the initial scanned pixel data $A_1$ is regarded as an error pixel value for the N-th pixel during the static calibration operation.

In the embodiment, the dust, the dirt or the creases on the calibration piece 14 may influence not only the specific pixel (i.e. the N-th pixel) but also the neighboring pixels. The range of the selected pixels can be extended to the neighboring pixels on both sides of the specific pixel. Namely, M neighboring pixels on both sides of the specific pixel are regarded as having the incorrect pixel values for the pixels during the static calibration operation, wherein M indicates the predetermined adjusting parameter and is an integer. The value of the predetermined adjusting parameter M is different if the scanner 1 has different image resolution and/or is operated at different modes, and is adjustable. After the above steps, the processing unit 11 acquires the predetermined adjusting parameter M from the compensation database 131 of the memory 13 and determines the plural pixels ranged from the (N−M)-th pixel to the (N+M)-th pixel as the selected pixels according to the predetermined adjusting parameter M. Furthermore, the processing unit 11 removes the compensation offset-ratio values of the selected pixels (i.e. pixels ranged from the (N−M)-th pixel to the (N+M)-th pixel) from the compensation offset-ratio data $A_R$, and obtains a second offset-ratio average $AVG_{R2}$ according to the residual compensation offset-ratio values of the compensation offset-ratio data $A_R$, where the second offset-ratio average $AVG_{R2}$ is calculated by the following equation (4).

$$AVG_{R2} = \frac{\sum_{i=1}^{n} R_i}{n - (2M+1)}, n > M, i \neq (N-M, N-M+1, \ldots, N+M) \qquad (4)$$

Thereafter, as shown in the following equation (5), the processing unit 11 allows the second offset-ratio average $AVG_{R2}$ multiplying the standard compensation values of the standard compensation data $A_0$ from the (N−M)-th pixel to the (N+M)-th pixel respectively, and the processing unit 11 obtains plural replacement compensation values for the pixels from the (N−M)-th pixel to the (N+M)-th pixel by subtracting the values of the second offset-ratio average $AVG_{R2}$ multiplying the standard compensation values of the standard compensation data $A_0$ from the (N−M)-th pixel to the (N+M)-th pixel respectively from the standard compensation values of the standard compensation data $A_0$ from the (N−M)-th pixel to the (N+M)-th pixel. The processing unit 11 replaces the initial scanned pixel values of the initial scanned pixel data $A_1$ from the (N−M)-th pixel to the (N+M)-th pixel with the above-mentioned replacement compensation values respectively, and maintains the residual initial scanned pixel values of the initial scanned pixel data $A_1$ Consequently, the initial scanned pixel data $A_1$ is transformed into a static compensation pixel data $A_2$.

$$A_2 = [G_1', G_2', \ldots, G_i', \ldots] = \qquad (5)$$
$$\begin{cases} G_i' = G_i & i \neq (N-M, N-M+1, \ldots, N+M) \\ G_i' = (1 - AVG_{R2}) \times SG_i & i = (N-M, N-M+1, \ldots, N+M) \end{cases}$$

After the static calibration is performed, the image capturing unit 12 of the scanner 1 is utilized to scan an object, and the processing unit 11 acquires the image information of the scanned object. The image processing module 112 is executed by the processing unit 11 to perform an image processing operation and calibrate the image information of the scanned object according to the static compensation pixel data $A_2$ for the plural pixels, which is generated by the static calibration. Finally, the calibrated image information of the scanned image is outputted by the image output unit 16.

In the embodiment, the image capturing unit 12 of the scanner 1 includes n pixels capable of scanning and capturing plural pixel values relative to the calibration piece 14. For illustration purpose only, 10 pixels (i.e. N=10) are an exemplary embodiment utilized to illustrate the compensation value adjustment method of the present invention. It is noted that the pixel number of the image capturing unit 12 is not limited to ten. As shown in Table 1, the standard compensation values $SG_i$ of the standard compensation data $A_0$ of the respective pixels are predetermined and stored in the memory 13. The predetermined compensation threshold value $T_0$ and the value of the predetermined adjusting parameter M are also preset and stored in the memory 13. In the embodiment, the standard compensation data $A_0 = [SG_1, SG_2, \ldots, SG_i, \ldots] = [241, 235, 234, \ldots]$, the predetermined compensation threshold value $T_0 = 0.03$ and the predetermined adjusting parameter M=1 are stored in the compensation database 131 of the memory 13. After the image sensing array 121 of the image capturing unit 12 scans the calibration piece 14, the initial scanned pixel data $A_1 = [G_1, G_2, \ldots, G_i, \ldots] = [236, 231, 230, \ldots]$ is obtained and the initial scanned pixel data $A_1$, the standard compensation data $A_0$, the predetermined compensation threshold value $T_0$ and the predetermined adjusting parameter M stored in the compensation database 131 are transmitted to the static correction and compensation module 111 of the processing unit 11, and the static calibration operation is performed. While the static calibration operation is performed, the compensation offset-ratio data $A_R = [R_1, R_2, \ldots, R_i, \ldots] = [0.02, 0.017, 0.021, \ldots]$ is generated according to the initial scanned pixel data $A_1$ and the standard compensation data $A_0$ and calculated by the above equation (1). In addition, the first offset-ratio average $AVG_{R1} = 0.039$ is obtained from all compensation offset-ratio values $R_i$ of the compensation offset-ratio data $A_R$ of the plural pixels and calculated by the above equation (2). Then, the absolute value of the difference between each compensation offset-ratio value of the compensation offset-ratio data $A_R$ of the respective pixels and the first offset-ratio average $AVG_{R1}$ is compared to the predetermined compensation threshold value $T_0$, respectively, and the processing unit 11 determines if the absolute value of the difference between each compensation offset-ratio value of the compensation offset-ratio data $A_R$ of the respective pixels and the first offset-ratio average $AVG_{R1}$ is larger than the predetermined compensation threshold value $T_0$, as shown in the above equation (3). When the absolute value of the difference between the N-th compensation offset-ratio value of the compensation offset-ratio data $A_R$ and the first offset-ratio average $AVG_{R1}$ is larger than the predetermined compensation threshold value $T_0$, the N-th initial scanned pixel value of the initial scanned pixel data $A_1=[G_1, G_2, \ldots, G_i, \ldots]=[236, 231, 230, \ldots]$ is regarded as an incorrect pixel value for the N-th pixel during the static calibration operation. In the embodiment, the 7th and 8th initial scanned pixel values of the initial scanned pixel data $A_1=[G_1, G_2, \ldots, G_i, \ldots]=[236, 231, 230, \ldots]$ are regarded as incorrect values for the 7th and 8th pixels during the static calibration operation. According to the predetermined adjusting parameter M and the above result, the range of the selected pixels is extended and plural pixels ranged from the (N−M)-th pixel to the (N+M)-th pixel are determined and regarded as the selected pixels. In the embodiment, the value of the predetermined adjusting parameter M is equal to 1, so that the 6th, 7th, 8th and 9th pixels are regards as the selected pixels. Then, the compensation offset-ratio values of the compensation offset-ratio data $A_R$ of the selected pixels (i.e. the pixels ranged from the (N−M)-th pixel to the (N+M)-th pixel) are removed, and the residual compensation offset-ratio values of the compensation offset-ratio data $A_R$ are utilized to obtain the second offset-ratio average $AVG_{R2}$, which is calculated by the above equation (4). In the embodiment, the compensation offset-ratio values of the compensation offset-ratio data $A_R$ of the 6th, 7th, 8th and 9th pixels are removed, and the residual compensation offset-ratio values of the compensation offset-ratio data $A_R$ of the first to 5th and 10th pixels are utilized to obtain the second offset-ratio average $AVG_{R2}$ (i.e., 0.019). Thereafter, as shown in the above equation (5), the processing unit 11 allows the second offset-ratio average $AVG_{R2}$ multiplying the standard compensation values of the standard compensation data $A_0$ from the (N−M)-th pixel to the (N+M)-th pixel respectively, and the processing unit 11 obtains plural replacement compensation values for the pixels from the (N−M)-th pixel to the (N+M)-th pixel by subtracting the values of the second offset-ratio average $AVG_{R2}$ multiplying the standard compensation values of the standard compensation data $A_0$ from the (N−M)-th pixel to the (N+M)-th pixel respectively from the standard compensation values of the standard compensation data $A_0$ from the (N−M)-th pixel to the (N+M)-th pixel. The processing unit 11 replaces the initial scanned pixel values of the initial scanned pixel data $A_1$ from the (N−M)-th pixel to the (N+M)-th pixel with the above-mentioned replacement compensation values respectively. In the embodiment, $G_6'=(1-0.019)\times 244=239$, $G_7'=(1-0.019)\times 235=231$, $G_8'=(1-0.019)\times 232=228$, and $G_9'=(1-0.019)\times 237=232$. In addition, the residual initial scanned pixel values of the initial scanned pixel data $A_1$ are maintained. In the embodiment, $G_1'=G_1=236$, $G_2'=G_2=231$, $G_3'=G_3=230$, $G_4'=G_4=236$, $G_5'=G_5=240$, and $G_{10}'=G_{10}=240$. Consequently, the static compensation pixel data $A_2=[G'_1, G'_2, \ldots, G'_i, \ldots]=[236, 231, 230, \ldots]$ is obtained as shown in Table 1.

TABLE 1

| | | Pixel number | | | | | | | | | |
|---|---|---|---|---|---|---|---|---|---|---|---|
| | | 1 | 2 | 3 | 4 | 5 | 6 | 7 | 8 | 9 | 10 |
| $A_0$ | $SG_i$ | 241 | 235 | 234 | 241 | 245 | 244 | 235 | 232 | 237 | 245 |
| $A_1$ | $G_i$ | 236 | 231 | 230 | 236 | 240 | 239 | 205 | 205 | 233 | 240 |
| $A_R$ | $R_i$ | 0.02 | 0.017 | 0.021 | 0.021 | 0.016 | 0.016 | 0.128 | 0.116 | 0.021 | 0.016 |
| | $AVG_{R1}$ | | | | | | 0.039 | | | | |
| | $T_0$ | | | | | | 0.03 | | | | |
| | M | | | | | | 1 | | | | |
| | $G_i = G'_i$ | 236 | 231 | 230 | 236 | 240 | — | — | — | — | 240 |
| | $AVG_{R2}$ | | | | | | 0.019 | | | | |
| | $G_i \neq G'_i$ | — | — | — | — | — | 239 | 231 | 228 | 232 | |
| $A_2$ | $G'_i$ | 236 | 231 | 230 | 236 | 240 | 239 | 231 | 228 | 232 | 240 |

It is noted that, the predetermined compensation threshold value $T_0$ and the value of the predetermined adjusting parameter M are adjustable according to the practical requirements.

Figure 3:
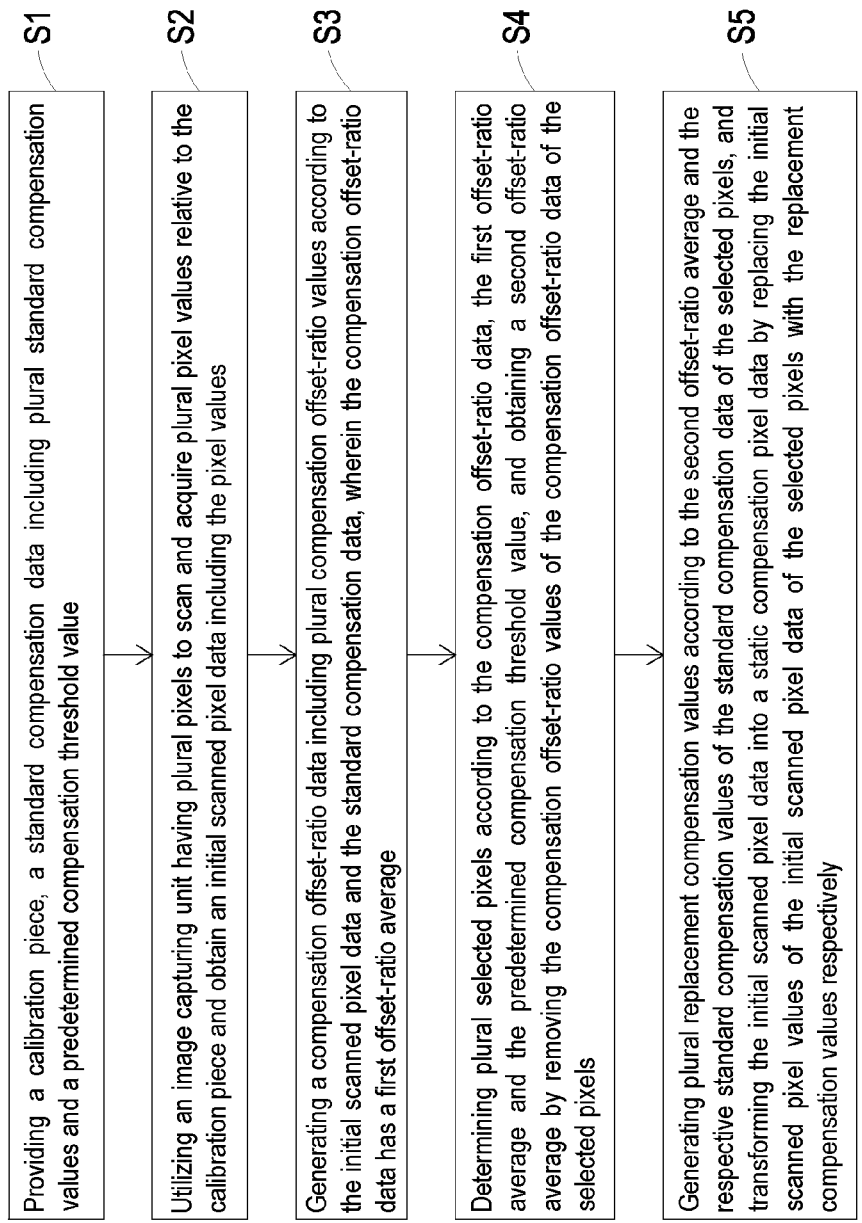
FIG. 3 is a flow chart illustrating a compensation value adjustment method according to a preferred embodiment of the present invention.

FIG. 3 is a flow chart illustrating the compensation value adjustment method according to a preferred embodiment of the present invention. As shown in FIGS. 1A, 1B, 2 and 3, the compensation value adjustment method for the scanner 1 of the present invention includes the following steps. Firstly, a calibration piece 14, a predetermined compensation threshold value $T_0$, a predetermined adjusting parameter M and at least a standard compensation data $A_0$ are provided (see step S1). The predetermined adjusting parameter M is an integer. The standard compensation data $A_0$ includes plural standard compensation values of plural pixels corresponding to the respective points on the calibration piece 14. In the embodiment, the calibration piece 14 is a calibration piece for compensating illuminance error of a light source. The calibration piece 14 is disposed on the structural part of the scanner 1 or separated from the scanner 1. Consequently, the calibration piece 14 can be scanned by the image sensing array 121 of the image capturing unit 12 for facilitating to perform the static calibration operation. The predetermined compensation threshold value $T_0$, the predetermined adjusting parameter M, and at least one standard compensation data $A_0$ are stored in the compensation database 131 of the memory 13 (as shown in FIG. 1A). The compensation database 131 can be for example but not limited to a memory. Then, the image capturing unit 12 having plural pixels is utilized by the scanner 1 to scan the image information of the calibration piece 14 and obtain an initial scanned pixel data $A_1$ including plural initial scanned pixel values of the plural pixels (see step S2). In addition, the processing unit 11 obtains the standard compensation data $A_0$ from the compensation database 131 of the memory 13, and a compensation offset-ratio data $A_R$ including plural compensation offset-ratio values R, of the pixels is generated according to the initial scanned pixel data $A_1$ and the standard compensation data $A_0$ and calculated by the above equation (1) (see step S3). The compensation offset-ratio data $A_R$ has a first offset-ratio average $AVG_{R1}$ and the first offset-ratio average $AVG_{R1}$ is calculated by the above equation (2). In addition, plural selected pixels are determined according to the compensation offset-ratio data $A_R$, the first offset-ratio average $AVG_{R1}$ and the predetermined compensation threshold value $T_0$, and a second offset-ratio average $AVG_{R1}$ is obtained after the compensation offset-ratio values of the compensation offset-ratio data $A_R$ of the selected pixels are removed (see Step S4). In this embodiment, the selected pixels are determined by comparing the absolute value of the difference between each compensation offset-ratio value of the compensation offset-ratio data $A_R$ of the respective pixels and the first offset-ratio average $AVG_{R1}$ to the predetermined compensation threshold value $T_0$, as shown in the above equation (3). When the absolute value of the difference between the N-th compensation offset-ratio value of the compensation offset-ratio data $A_R$ and the first offset-ratio average $AVG_{R1}$ is larger than the predetermined compensation threshold value $T_0$, the compensation offset-ratio values of the compensation offset-ratio data $A_R$ of the pixels from the (N−M)-th pixel to the (N+M)-th pixel are selected and determined. After removing the compensation offset-ratio values of the compensation offset-ratio data $A_R$ of the selected pixels (i.e. pixels ranged from the (N−M)-th pixel to the (N+M)-th pixel), the second offset-ratio average $AVG_{R2}$ is obtained according to the residual compensation offset-ratio values of the compensation offset-ratio data $A_R$ and calculated by the above equation (4). Finally, the static correction and compensation module 111 of the processing unit 11 generates plural replacement compensation values according to the second offset-ratio average $AVG_{R2}$ and the respective standard compensation values of the standard compensation data $A_0$ of the selected pixels. The initial scanned pixel data $A_1$ is transformed into a static compensation pixel data $A_2$ by replacing the initial scanned pixel values of the initial scanned pixel data $A_1$ of the selected pixels with the replacement compensation elements, respectively.

Figure 4:
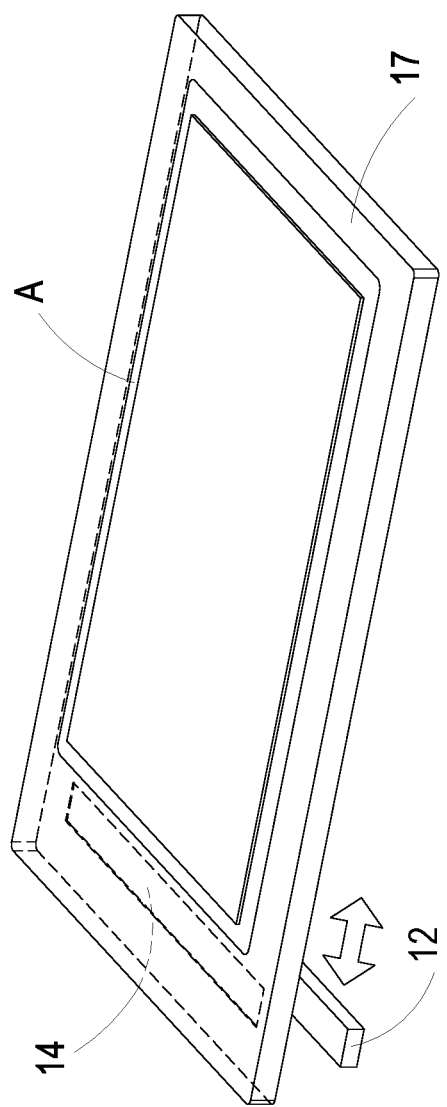
FIG. 4 is a perspective view illustrating the scanner executing the static calibration according to another preferred embodiment of the present invention.

FIG. 4 is a perspective view illustrating the scanner capable of executing the static calibration according to another preferred embodiment of the present invention. In the embodiment, the scanner 1a capable of executing the static calibration (hereafter referred to as the scanner) is a flatbed scanner. The elements and functions of the scanner 1a are similar to those of the scanner 1 in FIG. 1A and FIG. 2, and are not redundantly described herein. Different from the scanner 1 of FIG. 1A and FIG. 1B, in the embodiment, the scanner 1a includes a scanning platform 17, and the scanning platform 17 has a scanning area A. The scanning area A is a transparent area. The calibration piece 14 is disposed under the bottom of the scanning platform 17, located at a position adjacent to the peripheral edge of the scanning area A, and opposite to the image capturing unit 12. The image capturing unit 12 is disposed on the bottom side of the scanning platform 17. The image capturing unit 12 is capable of scanning the calibration piece 14 to capture the image information of the calibration piece 14 and scanning an object to capture the image information of the scanned object. While the static calibration is performed, both of the image capturing unit 12 and the calibration piece 14 are stationary and the image capturing unit 12 is aligned to the calibration piece 14. After the above steps of the compensation value adjustment method are performed by the scanner 1a, the compensation pixel values of the static calibration is accomplished. It is noted that the structure of the scanner capable of executing the static calibration is not limited to the above embodiment, and it is adjustable according to the practical requirements.

In summary, the present invention provides a scanner capable of executing a static compensation and a compensation value adjustment method. The image capturing unit and the calibration piece of the scanner are configured to execute the calibration operation on a static state without moving. Consequently, the incorrect compensation values for the respective pixels of the scanner during the calibration caused by dust, dirt or creases on the calibration piece are avoided. The accuracy of the successive image calibration and the quality of the outputting image are improved. The calibration piece has a smaller size, and the scanner can execute the calibration operation automatically. Even though there are some dust or dirt covering on the calibration piece or creases formed on the calibration piece, the compensation value adjustment for the respective pixels of the scanner during the static calibration can be executed automatically, and the accuracy of the successive image calibration and the quality of the outputting image are improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanner capable of executing a static calibration, comprising:
   a calibration piece;
   a memory having a compensation database, wherein a standard compensation data including plural standard compensation values and a predetermined compensation threshold value are stored in the compensation database;
   an image capturing unit including plural pixels and configured to scan and acquire the image information of the calibration piece and obtain an initial scanned pixel data including plural initial scanned pixel values of the plural pixels; and
   a processing unit connected with the image capturing unit and the compensation database, and comprising a static correction and compensation module, wherein the static correction and compensation module is executed to receive the initial scanned pixel data and generate a compensation offset-ratio data including plural compensation offset-ratio values of the plural pixels according to the initial scanned pixel data and the standard compensation data, wherein the compensation offset-ratio data has a first offset-ratio average, wherein plural selected pixels are determined according to the compensation offset-ratio data, the first offset-ratio average and the predetermined compensation threshold value, and a second offset-ratio average is obtained by removing the compensation offset-ratio values of the compensation offset-ratio data of the selected pixels, and plural replacement compensation values of the selected pixels are generated according to the second offset-ratio average and the respective standard compensation values of the standard compensation data of the selected pixels, wherein the initial scanned pixel data is transformed into a static compensation pixel data by replacing the initial scanned pixel values of the initial scanned pixel data of the selected pixels with the replacement compensation elements respectively.

2. The scanner capable of executing the static calibration according to claim 1, wherein a predetermined adjusting parameter is stored in the compensation database of the memory, and the static correction and compensation module of the processing unit determines a range of the selected pixels according to the predetermined adjusting parameter, wherein the predetermined adjusting parameter is an integer M.

3. The scanner capable of executing the static calibration according to claim 2, wherein when the absolute value of the difference between the N-th compensation offset-ratio value of the compensation offset-ratio data and the first offset-ratio average is larger than the predetermined compensation threshold value, the selected pixels are determined and ranged from the (N−M)-th pixel to the (N+M)-th pixel according to the predetermined adjusting parameter, wherein the second offset-ratio average is obtained by removing the compensation offset-ratio values of the compensation offset-ratio data of the selected pixels ranged from the (N−M)-th pixel to the (N+M)-th pixel, wherein the replacement compensation values of the selected pixels are generated by subtracting the values of the second offset-ratio average multiplying the standard compensation values of the standard compensation data from the (N−M)-th pixel to the (N+M)-th pixel respectively from the standard compensation values of the standard compensation data from the (N−M)-th pixel to the (N+M)-th pixel, wherein the initial scanned pixel values of the initial scanned pixel data from the (N−M)-th pixel to the (N+M)-th pixel are replaced with the replacement compensation values of the selected pixels respectively, and the residual initial scanned pixel values of the initial scanned pixel data are maintained so that the initial scanned pixel data is transformed into the static compensation pixel data.

4. The scanner capable of executing the static calibration according to claim 1, wherein the scanner is a handheld scanner or a flatbed scanner.

5. The scanner capable of executing the static calibration according to claim 1, wherein the image capturing unit is a contact image sensor or a charge-coupled device.

6. The scanner capable of executing the static calibration according to claim 1, further comprising an image output unit connected with the processing unit, wherein the processing unit further comprises an image processing module, and the image processing module is executed to perform an image processing operation according to the static compensation pixel data.

7. A compensation value adjustment method for a scanner, wherein the scanner is capable of executing a static calibration, the method comprising steps of:
(a) providing a calibration piece, a standard compensation data including plural standard compensation values and a predetermined compensation threshold value;
(b) utilizing an image capturing unit having plural pixels to scan and acquire plural pixel values relative to the calibration piece and obtain an initial scanned pixel data including the pixel values;
(c) generating a compensation offset-ratio data including plural compensation offset-ratio values according to the initial scanned pixel data and the standard compensation data, wherein the compensation offset-ratio data has a first offset-ratio average;
(d) determining plural selected pixels according to the compensation offset-ratio data, the first offset-ratio average and the predetermined compensation threshold value, and obtaining a second offset-ratio average by removing the compensation offset-ratio values of the compensation offset-ratio data of the selected pixels; and
(e) generating plural replacement compensation values according to the second offset-ratio average and the respective standard compensation values of the standard compensation data of the selected pixels, and transforming the initial scanned pixel data into a static compensation pixel data by replacing the initial scanned pixel values of the initial scanned pixel data of the selected pixels with the replacement compensation values respectively.

8. The compensation value adjustment method for the scanner according to claim 7, wherein the scanner comprises a processing unit comprising a static correction and compensation module, and the steps (c), (d) and (e) are performed by the static correction and compensation module.

9. The compensation value adjustment method for the scanner according to claim 8, wherein the scanner comprises a memory having a predetermined adjusting parameter stored therein, and the static correction and compensation module of the processing unit determines a range of the selected pixels according to the predetermined adjusting parameter, wherein the predetermined adjusting parameter is an integer M.

10. The compensation value adjustment method for the scanner according to claim 9, wherein the step (d) further comprises:
(d1) determining the selected pixels ranged from the (N−M)-th pixel to the (N+M)-th pixel according to the predetermined adjusting parameter when the absolute value of the difference between the N-th compensation offset-ratio value of the compensation offset-ratio data and the first offset-ratio average is larger than the predetermined compensation threshold value; and
(d2) obtaining the second offset-ratio average by removing the compensation offset-ratio values of the compensation offset-ratio data of the selected pixels ranged from the (N−M)-th pixel to the (N+M)-th pixel.

11. The compensation value adjustment method for the scanner according to claim 10, wherein the step (e) further comprises:
(e1) generating the replacement compensation values of the selected pixels by subtracting the values of the second offset-ratio average multiplying the standard compensation values of the standard compensation data from the (N−M)-th pixel to the (N+M)-th pixel respectively from the standard compensation values of the standard compensation data from the (N−M)-th pixel to the (N+M)-th pixel; and
(e2) replacing the initial scanned pixel values of the initial scanned pixel data from the (N−M)-th pixel to the (N+M)-th pixel with the replacement compensation values of the selected pixels respectively, and maintaining the residual initial scanned pixel values of the initial scanned pixel data, so that the initial scanned pixel data is transformed into the static compensation pixel data.

12. The compensation value adjustment method for the scanner according to claim 7, wherein the image capturing unit is a contact image sensor or a charge-coupled device.

* * * * *